(12) United States Patent
Ishida

(10) Patent No.: US 8,837,115 B2
(45) Date of Patent: Sep. 16, 2014

(54) ELECTROLYTIC CAPACITOR

(75) Inventor: Hideki Ishida, Takasago (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 299 days.

(21) Appl. No.: 13/498,359

(22) PCT Filed: Sep. 27, 2010

(86) PCT No.: PCT/JP2010/066653
§ 371 (c)(1),
(2), (4) Date: Jun. 8, 2012

(87) PCT Pub. No.: WO2011/040353
PCT Pub. Date: Apr. 7, 2011

(65) Prior Publication Data
US 2012/0243146 A1    Sep. 27, 2012

(30) Foreign Application Priority Data

Sep. 30, 2009  (JP) .................................. 2009-226912

(51) Int. Cl.
| | |
|---|---|
| H01G 4/32 | (2006.01) |
| H01G 9/04 | (2006.01) |
| H01G 4/228 | (2006.01) |
| H01G 9/10 | (2006.01) |
| H01G 9/15 | (2006.01) |
| H01G 9/012 | (2006.01) |
| H01G 9/055 | (2006.01) |
| H01G 9/048 | (2006.01) |

(52) U.S. Cl.
CPC .............. *H01G 9/012* (2013.01); *H01G 9/055* (2013.01); *H01G 9/048* (2013.01); *H01G 9/151* (2013.01)
USPC ............................ 361/530; 361/533; 361/520

(58) Field of Classification Search
CPC ....... H01G 9/008; H01G 9/012; H01G 4/228; H01G 4/232; H01G 4/236
USPC .......... 361/517, 519, 535, 538, 531, 533, 520
See application file for complete search history.

(56) References Cited

U.S. PATENT DOCUMENTS

2005/0207090 A1   9/2005 Kuriyama
2007/0115611 A1*  5/2007 Fujimoto et al. .............. 361/508

(Continued)

FOREIGN PATENT DOCUMENTS

| | | | |
|---|---|---|---|
| JP | 63299307 A | * | 12/1988 |
| JP | 2005-150128 A | | 6/2005 |

(Continued)

OTHER PUBLICATIONS

International Search Report of PCT/JP2010/066653, date of mailing Dec. 21, 2010, 5 pages.

(Continued)

*Primary Examiner* — Eric Thomas
(74) *Attorney, Agent, or Firm* — Westerman, Hattori, Daniels & Adrian, LLP

(57) ABSTRACT

An electrolytic capacitor includes an electrolytic capacitor element, anode terminals as a pair, and a conductive member. The capacitor element has an anode body formed by placing an anode foil and a cathode foil one above the other and by winding the anode and cathode foils, anode leads as a pair electrically connected to the anode foil, and a cathode lead electrically connected to the cathode foil. A dielectric layer is formed on a surface of the anode foil. A electrolyte layer is placed between the dielectric layer and the cathode foil. The anode terminals as a pair are each electrically connected to corresponding one of anode leads as a pair of the capacitor element. The conductive member electrically connects the anode terminals to each other outside the capacitor element.

18 Claims, 5 Drawing Sheets

(56) References Cited

U.S. PATENT DOCUMENTS

2009/0154067 A1 6/2009 Kurita et al.
2009/0195965 A1 8/2009 Fujimoto

FOREIGN PATENT DOCUMENTS

| JP | 2005-191504 A | 7/2005 |
| JP | 2005-210024 A | 8/2005 |
| JP | 2009-188184 A | 8/2009 |
| WO | 2008-035684 A1 | 3/2008 |
| WO | WO 2008029694 A1 * | 3/2008 |

OTHER PUBLICATIONS

Written Opinion of the International Searching Authority of PCTJP2010/066653 dated Dec. 21, 2010, 6 pages.

* cited by examiner

ELECTROLYTIC CAPACITOR

TECHNICAL FIELD

The present invention relates to an electrolytic capacitor capable of removing high-frequency noise.

BACKGROUND ART

When the electrolytic capacitor of a two terminal structure is mounted on a circuit board, the electrolytic capacitor is connected between a power supply line connecting a load circuit such as a CPU (central processing unit) and a power supply circuit supplying DC current to the load circuit, and the ground. Mounting the electrolytic capacitor on the circuit board in this way causes the electrolytic capacitor to function as a secondary battery to supply electrical charges to the load circuit if load fluctuations are generated in the load circuit, while causing the electrolytic capacitor to function as a noise filter to remove high-frequency noise from the power supply line if the high-frequency noise is generated in response to drive of the load circuit.

Recent years have experienced increase of the operating speed of a load circuit and increase of the complexity of the circuit. So, the band of high-frequency noise is shifted to a higher frequency and is broadened. As a result, it becomes difficult for an electrolytic capacitor of a two terminal structure to remove high-frequency noise efficiently.

In response, use of an electrolytic capacitor of a three terminal structure having a low equivalent series inductance (ESL) in place of an electrolytic capacitor of a two terminal structure has been suggested. As an example, patent literature 1 suggests an electrolytic capacitor formed by placing an anode foil and a cathode foil one above the other to which a pair of anode terminals and a cathode terminal are electrically connected respectively, and by winding the anode and cathode foils. In this electrolytic capacitor, a dielectric layer is formed on a surface of the anode foil, and a separator saturated with an electrolytic solution is placed between the dielectric layer and the cathode foil.

When the electrolytic capacitor of a three terminal structure disclosed in patent literature 1 is mounted on a circuit board, the anode terminals as a pair of the electrolytic capacitor are connected to a load circuit and a power supply circuit respectively, and the cathode terminal is connected to the ground. Thus, DC current from the power supply circuit passes through the anode foils of the electrolytic capacitor, and is then supplied to the load circuit. High-frequency noise generated in the load circuit passes through the electrolytic capacitor internally, and is then guided to the ground efficiently.

Patent literature 1: Japanese Patent Application Laid-Open No. 2000-114111

DISCLOSURE OF THE INVENTION

Problems to be Solved by the Invention

However, the electrolytic capacitor of a three terminal structure disclosed in patent literature 1 makes an equivalent series resistance (ESR) generated between the anode terminals as a pair higher than the resistance of a power supply line. Thus, DC current of a large current amount cannot flow between the anode terminals as a pair of the electrolytic capacitor, so DC current of a large current amount cannot be supplied to the load circuit. This makes it difficult to respond to increase of the operating speed of the load circuit.

Further, in the aforementioned electrolytic capacitor of a three terminal structure, conducting part having a high electrical resistance generates heat, generating a fear of breakdown of the electrolytic capacitor, and also, a fear of breakdown of a member located around the electrolytic capacitor.

So, it is an object of the present invention to provide an electrolytic capacitor capable of causing DC current of a large current amount to flow between anode terminals as a pair, and capable of guiding high-frequency noise from an anode to a cathode.

Means for Solving Problems

A first electrolytic capacitor of the present invention includes an electrolytic capacitor element, anode terminals as a pair, and a conductive member. The capacitor element has an element body formed by placing an anode foil and a cathode foil one above the other and by winding the anode and cathode foils, anode leads as a pair electrically connected to the anode foil, and a cathode lead electrically connected to the cathode foil. A dielectric layer is formed on a surface of the anode foil. An electrolyte layer is placed between the dielectric layer and the cathode foil. The anode terminals as a pair are each electrically connected to corresponding one of the anode leads as a pair of the capacitor element. The conductive member electrically connects the anode terminals to each other outside the capacitor element.

The aforementioned electrolytic capacitor is capable of making the resistance of the conductive member lower than an equivalent series resistance (ESR) generated between the anode leads as a pair of the capacitor element. Thus, DC current flowing between the anode terminals as a pair flows easily through the conductive member having a low resistance, allowing increase of the current amount of the DC current.

Further, high-frequency noise entering the anode terminals passes through the capacitor element internally, and then can be guided toward the cathode lead of the capacitor element.

A second electrolytic capacitor of the present invention includes an electrolytic capacitor element, anode terminals as a pair, and a conductive member. The capacitor element has an element body formed by placing two anode foils electrically isolated from each other and a cathode foil one above the other and by winding the anode and cathode foils, anode leads as a pair each electrically connected to corresponding one of the two anode foils, and a cathode lead electrically connected to the cathode foil. A dielectric layer is formed on surfaces of the anode foils. An electrolyte layer is placed between the dielectric layer and the cathode foil. The anode terminals as a pair are each electrically connected to corresponding one of the anode leads as a pair of the capacitor element. The conductive member electrically connects the anode terminals to each other outside the capacitor element.

In the aforementioned electrolytic capacitor, the conductive member electrically connects the anode terminals as a pair outside the capacitor element, and at the same time, the anode terminals as a pair are electrically isolated from each other inside the capacitor element. So, DC current flowing between the anode terminals as a pair flows through the conductive member having a low resistance, allowing increase of the current amount of the DC current.

Further, high-frequency noise entering the anode terminals passes through the capacitor element internally, and then can be guided to the cathode lead of the capacitor element.

In specific structures of the first and second electrolytic capacitors, the conductive member is composed of a bottomed cylindrical metal case housing the capacitor element.

In different specific structures of the first and second electrolytic capacitors, the conductive member is a bottomed cylindrical insulating case with a conductive layer at the inner circumference thereof, and the conductive layer electrically connects the anode terminals to each other.

In still different specific structures of the first and second electrolytic capacitors, the conductive member has an inductance higher than the equivalent series inductance of the capacitor element.

High-frequency noise flows easily into part having a low inductance. So, in these specific structures, high-frequency noise entering the anode terminals is led toward the capacitor element, and is then guided efficiently to the cathode lead of the capacitor element.

In a more specific structure, the conductive member is given a constriction that makes the width of the conductive member small in a direction that crosses an electrical path extending from one of the anode terminals to the other of the anode terminals along a surface of the conductive member.

Formation of the constriction in the conductive member in this way increases the inductance of the conductive member. Thus, the inductance of the conductive member can be made higher than the equivalent series inductance (ESL) of the capacitor element.

Effect Of The Invention

The electrolytic capacitor of the present invention is capable of causing DC current of a large current amount to flow between the anode terminals as a pair, and capable of guiding high-frequency noise from an anode to a cathode.

EMBODIMENTS FOR CARRYING OUT THE INVENTION

Figure 1:
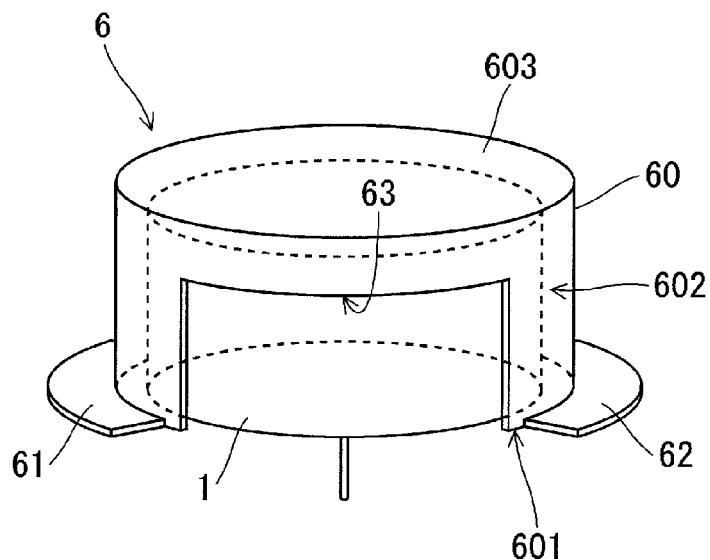
FIG. 1 is a perspective view showing an electrolytic capacitor of an embodiment of the present invention.

An embodiment of the present invention is described in detail by referring to the drawings.

FIG. 1 is a perspective view showing an electrolytic capacitor of an embodiment of the present invention. As shown in FIG. 1, the electrolytic capacitor of the present embodiment includes an electrolytic capacitor element (1), and a bottomed cylindrical metal case (6) housing the capacitor element (1).

Figure 2:
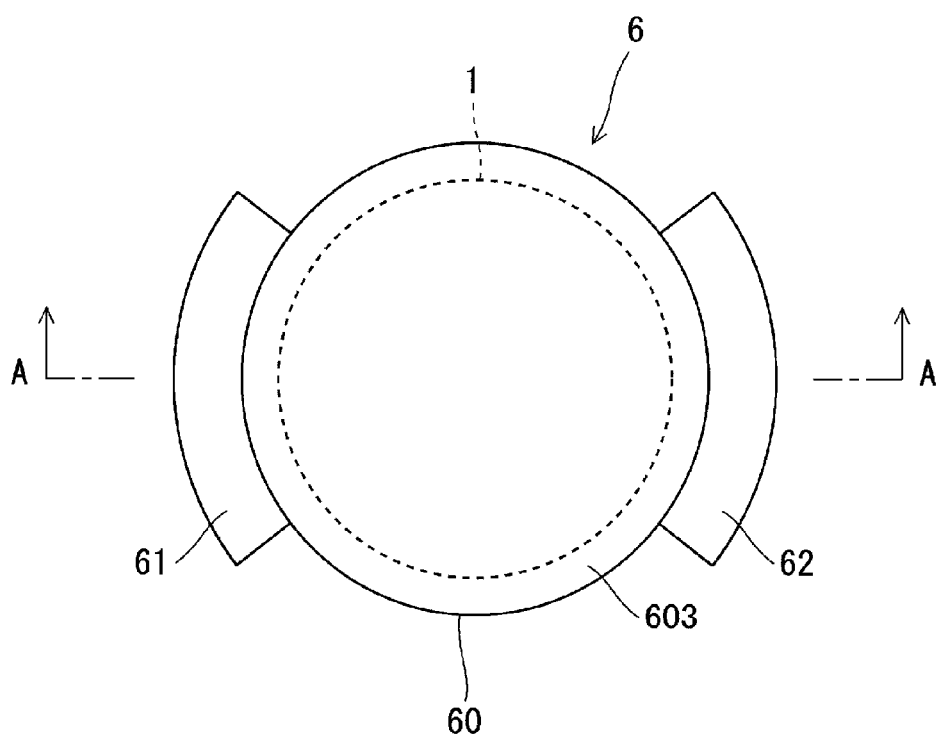
FIG. 2 is a plan view of the electrolytic capacitor as viewed from a bottom wall of a metal case provided in the electrolytic capacitor.
Figure 3:
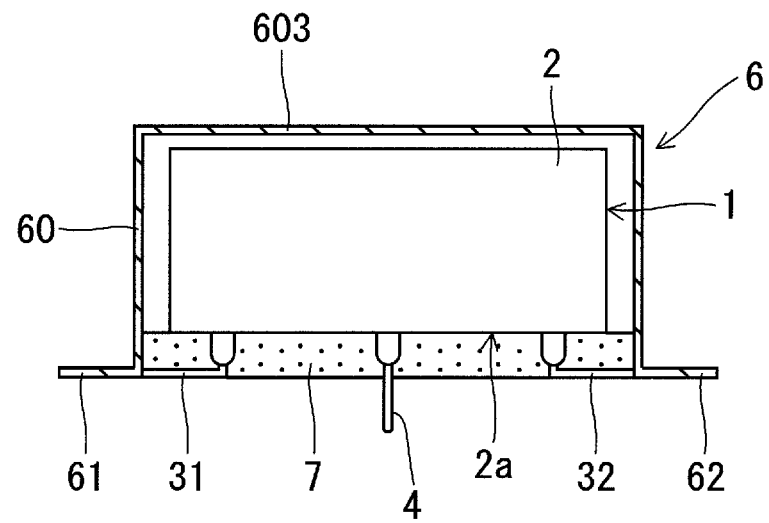
FIG. 3 is a sectional view taken along line A-A shown in FIG. 2.

FIG. 2 is a plan view of the electrolytic capacitor as viewed from a bottom wall (603) of the metal case (6). FIG. 3 is a sectional view taken along line A-A shown in FIG. 2. As shown in FIG. 3, the capacitor element (1) includes an element body (2), a pair of anode leads (31) and (32), and a cathode lead (4).

Figure 4:
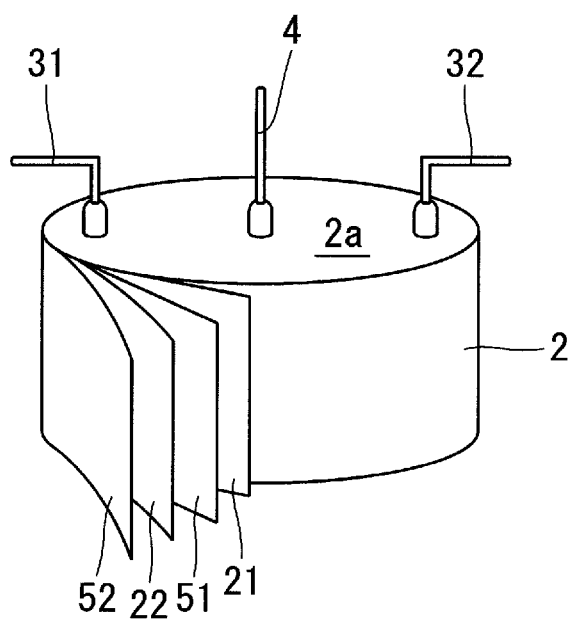
FIG. 4 is a perspective view showing an element body of a capacitor element provided in the electrolytic capacitor.

FIG. 4 is a perspective view showing the element body (2). As shown in FIG. 4, the element body (2) is a wound body formed by placing a long-length anode foil (21) and a long-length cathode foil (22) one above the other, and by winding the anode and cathode foils (21) and (22). Two separators (51) and (52) made of craft paper or the like are placed between the anode and cathode foils (21) and (22).

The anode and cathode foils (21) and (22) are made of a valve acting metal such as aluminum. A surface of the anode foil (21) is given fine recesses and projections formed as a result of etching process. So, the anode foil (21) has a wide surface area. The surface of the anode foil (21) is also provided with an oxide coating film formed as a result of chemical conversion process. This means that a dielectric layer made of the oxide coating film is formed on the surface of the anode foil (21). A dielectric layer made of an oxide coating film may also be formed on a surface of the cathode foil (22).

A solid electrolyte layer is formed between the dielectric layer on the surface of the anode foil (21) and the cathode foil (22). The solid electrolyte layer may be formed of materials such as an inorganic semiconductor, an organic semiconductor, and a conductive polymer.

Although not shown in FIG. 4, the pair of anode leads (31) and (32) is electrically connected to the anode foil (21), and the cathode lead (4) is electrically connected to the cathode foil (22). Also, as shown in FIG. 4, the cathode lead (4) is pulled out through a central portion of an edge surface (2a). The edge surface (2a) is part of a surface of the element body (2) and crosses the winding axis of the element body (2). The anode leads (31) and (32) as a pair are pulled out through an outer circumferential section of the edge surface (2a) at positions opposite each other with respect to the cathode lead (4).

Figure 5:
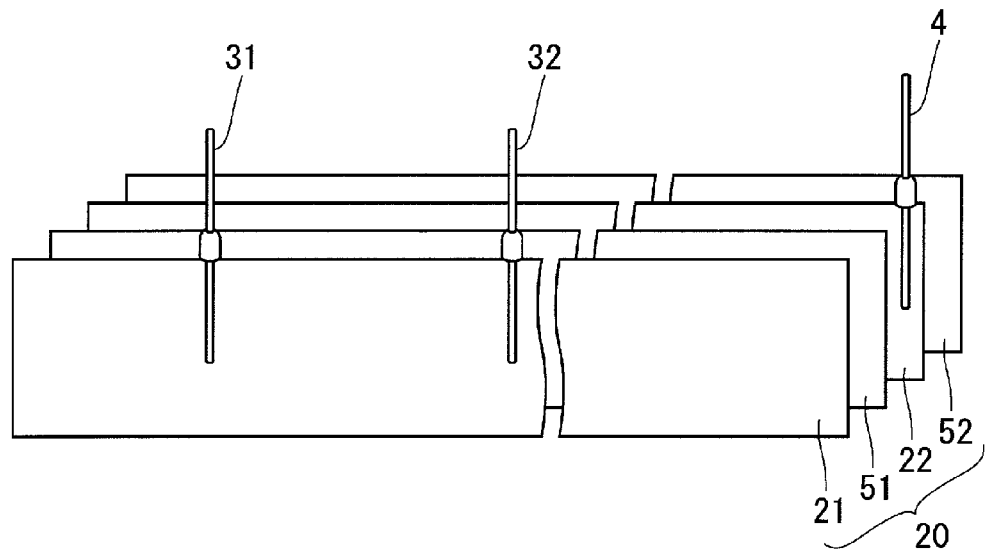
FIG. 5 is a perspective view explaining a process of manufacturing the capacitor element.

In order to form the capacitor element (1), as shown in FIG. 5, the long-length anode foil (21) and the long-length cathode foil (22) are placed one above the other while the first separator (51) is placed between the anode and cathode foils (21) and (22). Further, the second separator (52) is placed to cover a surface of the cathode foil (22) opposite the surface thereof over which the anode foil (21) is placed, thereby forming a long-length body (20). In the long-length body (20), the pair of anode leads (31) and (32) and the cathode lead (4) are electrically connected to the anode and cathode foils (21) and (22) respectively such that the pair of anode leads (31) and (32) and the cathode lead (4) are placed at their predetermined positions on the edge surface (2a) of the element body (2) when the element body (2) is formed by winding the long-length body (20).

Next, the long-length body (20) is wound from the right end thereof shown in FIG. 5 while the anode foil (21) is placed at the innermost side. As a result, formation of the element body (2) is completed from which the pair of anode leads (31) and (32), and the cathode lead (4) are pulled out as shown in FIG. 4.

Figure 6:
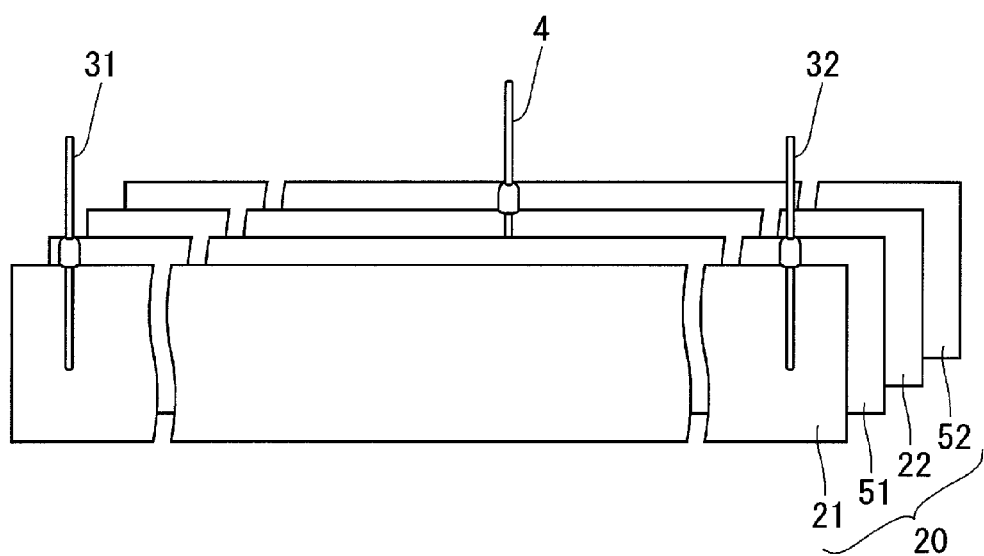
FIG. 6 is a perspective view explaining a different aspect of the manufacture of the capacitor element.

In the long-length body (20), the cathode lead (4) may be connected to the cathode foil (22) at a substantially middle position in the longitudinal direction thereof, and the anode leads (31) and (32) as a pair may be connected to the anode foil (21) at opposite end portions thereof as shown in FIG. 6. In this case, the long-length body (20) is wound from a substantially middle position in the longitudinal direction thereof.

Although not shown, the solid electrolyte layer is thereafter formed by using a conductive polymer. More specifically, the element body (2) is dipped into a polymerization solution containing a precursor solution of the conductive polymer, and then chemical polymerization or electropolymerization is generated. Dipping the element body (2) in the polymerization solution makes the polymerization solution penetrate the two separators (51) and (52) to seep into between the dielectric layer formed on the surface of the anode foil (21) and the cathode foil (22). As a result, the solid electrolyte layer is formed between the dielectric layer on the surface of the anode foil (21) and the cathode foil (22), thereby completing the formation of the capacitor element (1).

The metal case (6) is made of a conductive member such as aluminum. As shown in FIG. 1, the metal case (6) is given a pair of flange portions (61) and (62). The flange portions (61) and (62) as a pair are formed by extending parts of the metal case (6) outward from two regions defined in an opening edge (601) of the metal case (6). In the embodiment, the flange portions (61) and (62) as a pair are provided at opposite sides of a cylindrical part (60) of the metal case (6) as shown in FIG. 2. However, this is not the only positions of the flange portions (61) and (62) as a pair.

As shown in FIG. 1, an outer wall (602) of the cylindrical part (60) of the metal case (6) is given a pair of constrictions (63) (only one of the constrictions (63) is shown in FIG. 1). The constrictions (63) as a pair are exposed at the opening edge (601) in two regions located between the regions where the flange portions (61) and (62) as a pair are formed. So, the width of the outer wall (602) is smaller between the flange portions (61) and (62) as a pair.

As shown in FIG. 3, the capacitor element (1) is housed in the metal case (6) in a position that makes the edge surface (2a) of the element body (2) face a side of the metal case (6) opposite the bottom wall (603). The anode leads (31) and (32) as a pair of the capacitor element (1) are electrically connected respectively to the flange portions (61) and (62) as a pair of the metal case (6).

So, the pair of flange portions (61) and (62) forms a pair of anode terminals of the electrolytic capacitor, and the cylindrical part (60) of the metal case (6) forms a conductive member electrically connecting the anode terminals to each other outside the capacitor element (1).

The presence of the pair of constrictions (63) makes the width of the cylindrical part (60) of the metal case (6) small in a direction that crosses an electrical path extending from one flange portion (61) to the other flange portion (62) along a surface of the cylindrical part (60). Thus, the cylindrical part (60) of the metal case (6) has an inductance higher than the equivalent series inductance (ESL) of the capacitor element (1).

As shown in FIG. 3, an opening of the metal case (6) is sealed with a sealing material (7) made of a resin material, a rubber material, or the like. The cathode lead (4) of the capacitor element (1) is supported by the sealing material (7) by making the tip end portion of the cathode lead (4) project outward of a surface of the sealing material (7), thereby fixedly placing the capacitor element (1) in the metal case (6). The tip end portion of the cathode lead (4) forms a cathode terminal of the electrolytic capacitor.

If a rubber material is used as the sealing material (7), the sealing material (7) is inserted into the opening of the metal case (6), and thereafter, an opening edge portion of the metal case (6) is swaged to fix the sealing material (7) to the metal case (6), thereby sealing the opening of the metal case (6).

The aforementioned electrolytic capacitor is capable of making the resistance of the cylindrical part (60) of the metal case (6) lower than an equivalent series resistance (ESR) generated between the anode leads (31) and (32) as a pair of the capacitor element (1). Thus, DC current flowing between the flange portions (61) and (62) as a pair (anode terminals as a pair) flows easily through the cylindrical part (60) of the metal case (6) having a low resistance, allowing increase of the current amount of the DC current.

High-frequency noise flows easily into part having a low inductance. Further, in the aforementioned electrolytic capacitor, the inductance of the cylindrical part (60) of the metal case (6) is higher than the equivalent series inductance (ESL) of the capacitor element (1). So, high-frequency noise entering the flange portions (61) and (62) (anode terminals) is led toward the capacitor element (1), and is then guided efficiently to the cathode lead (4) of the capacitor element (1).

When the aforementioned electrolytic capacitor is mounted on a circuit board, the flange portions (61) and (62) as a pair (anode terminals as a pair) of electrolytic capacitor are connected to a load circuit and a power supply circuit respectively, and the tip end portion (cathode terminal) of the cathode lead (4) of the electrolytic capacitor is connected to the ground. As a result of mounting of the electrolytic capacitor on the circuit board in this way, DC current from the power supply circuit passes through the metal case (6) having a low resistance, and is then supplied to the load circuit. This makes it possible to supply DC current of a large current amount from the power supply circuit to the load circuit. High-frequency noise generated in the load circuit is led toward the capacitor element (1) of the electrolytic capacitor, and is then guided efficiently to the ground.

Figure 7:
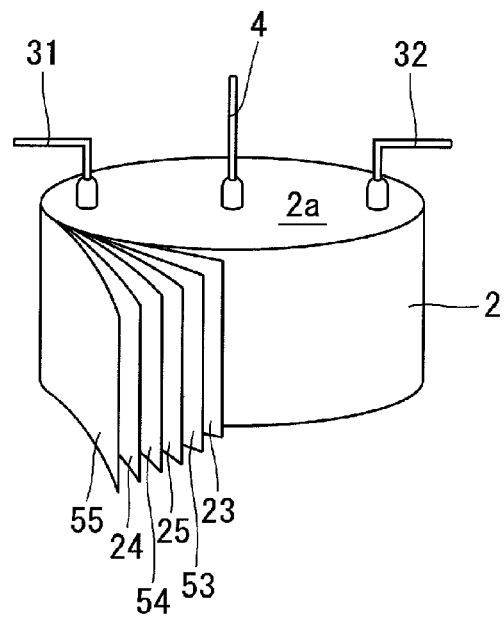
FIG. 7 is a perspective view showing a modification of the capacitor element of the electrolytic capacitor.

FIG. 7 is a perspective view showing a modification of the capacitor element of the aforementioned electrolytic capacitor. As shown in FIG. 7, the element body (2) of the capacitor element (1) may be a wound body formed by placing two long-length anode foils (23) and (24) one above the other with a cathode foil (25) being placed therebetween, and by winding the anode foils (23) and (24) and the cathode foil (25). In this case, three separators (53), (54) and (55) made of craft paper or the like are placed between the two anode foils (23) and (24) and the cathode foil (25).

The two anode foils (23) and (24) and the cathode foil (25) are made of a valve acting metal such as aluminum. Surfaces of the two anode foils (23) and (24) are given fine recesses and projections formed as a result of etching process. So, the two anode foils (23) and (24) both have wide surface areas. The surfaces of the two anode foils (23) and (24) are also provided with an oxide coating film formed as a result of chemical conversion process. This means that a dielectric layer made of the oxide coating film is formed on the surfaces of the two anode foils (23) and (24). A dielectric layer made of an oxide coating film may also be formed on a surface of the cathode foil (25).

A solid electrolyte layer is formed between the dielectric layer on the surfaces of the two anode foils (23) and (24) and the cathode foil (25). The solid electrolyte layer may be formed of materials such as an inorganic semiconductor, an organic semiconductor, and a conductive polymer.

Although not shown in FIG. 7, the anode leads (31) and (32) as a pair are electrically connected to the two anode foils (23) and (24) respectively, and the cathode lead (4) is electrically connected to the cathode foil (25).

Figure 8:
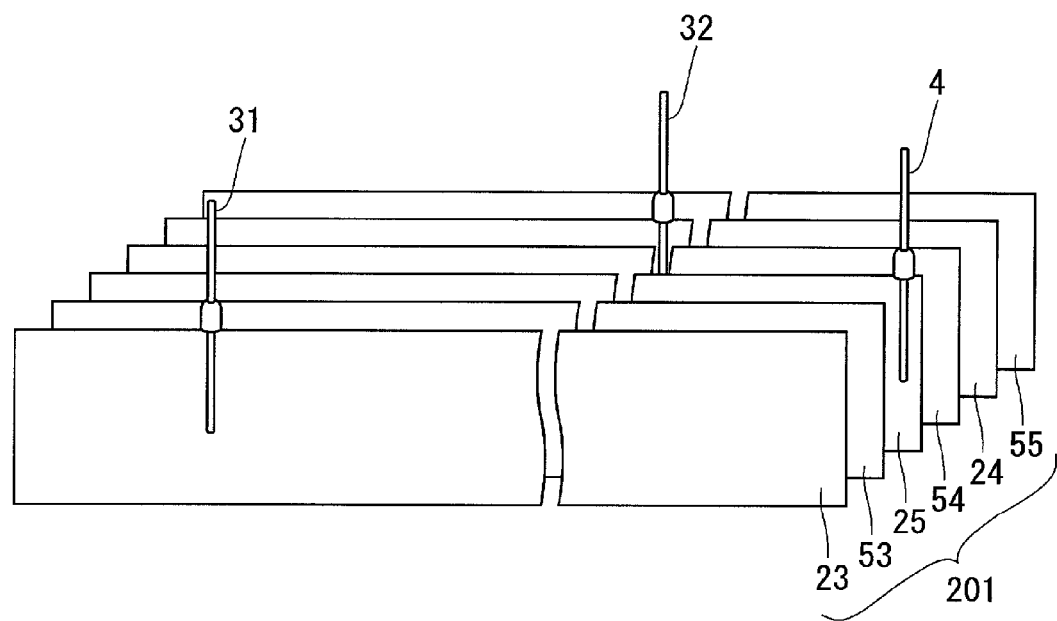
FIG. 8 is a perspective view explaining a process of manufacturing the capacitor element of the modification.

In order to form the capacitor element (1) of the modification, as shown in FIG. 8, the long-length cathode foil (25) is placed between the two long-length anode foils (23) and (24). Further, the first and second separators (53) and (54) are placed between the anode foil (23) and the cathode foil (25) and between the anode foil (24) and the cathode foil (25) respectively. Still further, the third separator (55) is placed to cover a surface of the anode foil (24) opposite the surface thereof over which the cathode foil (25) is placed, thereby forming a long-length body (201). In the long-length body (201), the anode leads (31) and (32) as a pair and the cathode lead (4) are electrically connected respectively to the two anode foils (23) and (24) and the cathode foil (25) such that the pair of anode leads (31) and (32) and the cathode lead (4) are placed at their predetermined positions on the edge surface (2a) of the element body (2) when the element body (2) is formed by winding the long-length body (201).

Next, the long-length body (201) is wound from the right end thereof shown in FIG. 8 while the anode foil (23) is placed at the innermost side. As a result, formation of the element body (2) of the capacitor element (1) of the modification is completed as shown in FIG. 7.

Although not shown, the solid electrolyte layer is thereafter formed by using a conductive polymer. More specifically, the element body (2) is dipped into a polymerization solution containing a precursor solution of the conductive polymer, and then chemical polymerization or electropolymerization is generated. Dipping the element body (2) in the polymerization solution makes the polymerization solution penetrate the three separators (53), (54) and (55) to seep into between the dielectric layer formed on the surfaces of the two anode foils (23) and (24) and the cathode foil (25). As a result, the solid electrolyte layer is formed between the dielectric layer on the surfaces of the two anode foils (23) and (24) and the cathode foil (25), thereby completing the formation of the capacitor element (1) of the modification.

In the electrolytic capacitor employing the capacitor element (1) of the modification, the cylindrical part (60) of the metal case (6) electrically connects the flange portions (61) and (62) as a pair (anode terminals as a pair) of the metal case (6) outside the capacitor element (1), and at the same time, the flange portions (61) and (62) as a pair (anode terminals as a pair) are electrically isolated from each other inside the capacitor element (1). So, DC current flowing between the flange portions (61) and (62) as a pair (anode terminals as a pair) flows through the cylindrical part (60) of the metal case (6) having a low resistance, allowing increase of the current amount of the DC current.

Like in the electrolytic capacitor shown in FIG. 1, high-frequency noise entering the flange portions (61) and (62) (anode terminals) is led toward the capacitor element (1), and is then guided efficiently to the cathode lead (4) of the capacitor element (1).

Figure 9:
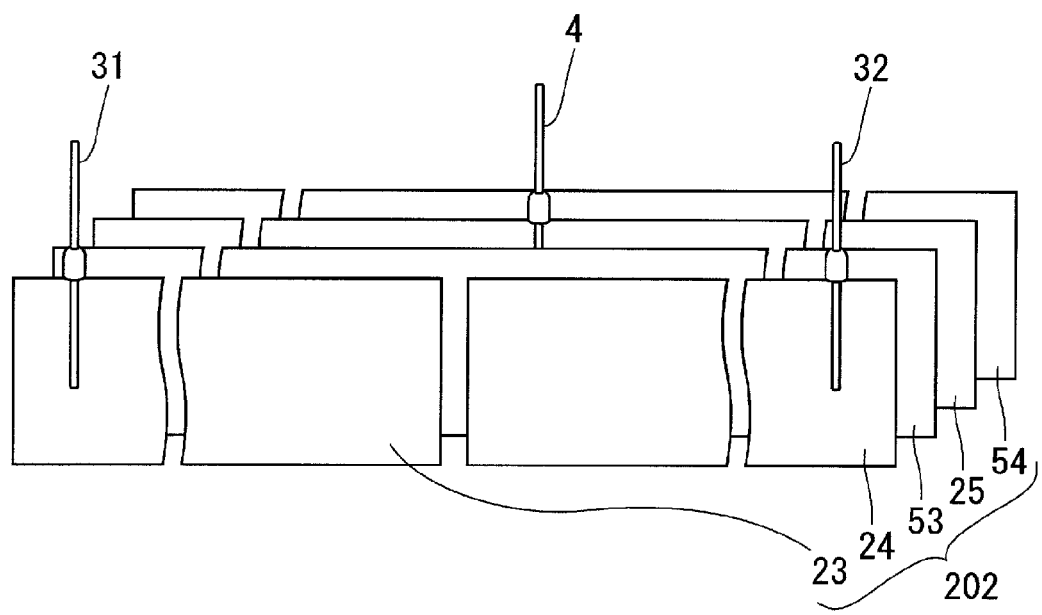
FIG. 9 is a perspective view explaining a different aspect of the manufacture of the capacitor element of the modification.

In order for the flange portions (61) and (62) as a pair (anode terminals as a pair) to be electrically isolated from each other inside the capacitor element (1), the capacitor element (1) may be formed by using a long-length body (202) shown in FIG. 9. More specifically, the long-length body (202) is formed by placing the long-length cathode foil (25) between the first and second separators (53) and (54), and by placing the two anode foils (23) and (24) to cover different regions of a surface of the first separator (53) opposite the surface thereof on which the cathode foil (25) is placed. The two anode foils (23) and (24) are arranged at positions separated from each other to provide electrical isolation therebetween.

In the long-length body (202), the cathode lead (4) is connected to the cathode foil (25) at a substantially middle position in the longitudinal direction thereof, and the anode leads (31) and (32) as a pair are connected to the two anode foils (23) and (24) respectively. Further, the long-length body (202) is wound from a substantially middle position in the longitudinal direction thereof.

The structure of each part of the present invention is not limited to that shown in the embodiment described above. Various modifications can be devised without departing from the technical scope recited in claims.

In the aforementioned embodiment, the cylindrical part (60) of the metal case (6) is given the pair of constrictions (63) in order to make the inductance of the cylindrical part (60) of the metal case (6) higher than the equivalent series inductance (ESL) of the capacitor element (1), to which the present invention is not intended to be limited. As an example, the inductance of the cylindrical part (60) of the metal case (6) can be made higher than the equivalent series inductance (ESL) of the capacitor element (1) by forming one or a plurality of through holes in the cylindrical part (60) of the metal case (6).

The metal case (6) may be replaced a bottomed cylindrical insulating case with a conductive layer at the inner circumference thereof that houses the capacitor element (1). In this case, part of the conductive layer can form a pair of anode terminals of the electrolytic capacitor. Or, a pair of anode terminals may be provided in addition to the conductive layer, and the conductive layer may electrically connect the anode terminals to each other.

Each structure employed in the aforementioned electrolytic capacitor is not applied only to an electrolytic capacitor of a three terminal structure, but it is also applicable to an electrolytic capacitor having four or more terminals.

Reference Signs List
(1) Capacitor element
(2) Element body
(21) Anode foil
(22) Cathode foil
(23) (24) Two anode foils
(25) Cathode foil
(31) (32) Pair of anode leads
(4) Cathode lead
(6) Metal case
(60) Cylindrical part (conductive member)
(61) (62) Pair of flange portions (pair of anode terminals)
(63) Constriction

The invention claimed is:
1. An electrolytic capacitor, comprising:
an electrolytic capacitor element having an element body formed by placing an anode foil and a cathode foil one above the other and by winding the anode and cathode foils, anode leads as a pair electrically connected to the anode foil, and a cathode lead electrically connected to the cathode foil, a dielectric layer being formed on a surface of the anode foil, an electrolyte layer being placed between the dielectric layer and the cathode foil;
anode terminals as a pair each electrically connected to corresponding one of the anode leads as a pair of the capacitor element; and
a conductive member electrically connecting the anode terminals to each other outside the capacitor, and composed of a case housing the capacitor element.
2. The electrolytic capacitor according to claim 1, wherein the case is a bottomed cylindrical metal case housing the capacitor element.
3. The electrolytic capacitor according to claim 2, wherein the conductive member has an inductance higher than the equivalent series inductance of the capacitor element.
4. The electrolytic capacitor according to claim 3, wherein the conductive member is given a constriction that makes the width of the conductive member small in a direction that crosses an electrical path extending from one of the anode terminals to the other of the anode terminals along a surface of the conductive member.

5. The electrolytic capacitor according to claim 1, wherein the case is a bottomed cylindrical insulating case with a conductive layer at the inner circumference thereof that houses the capacitor element, and the conductive layer electrically connects the anode terminals to each other.

6. The electrolytic capacitor according to claim 5, wherein the conductive member has an inductance higher than the equivalent series inductance of the capacitor element.

7. The electrolytic capacitor according to claim 6, wherein the conductive member is given a constriction that makes the width of the conductive member small in a direction that crosses an electrical path extending from one of the anode terminals to the other of the anode terminals along a surface of the conductive member.

8. The electrolytic capacitor according to claim 1, wherein the conductive member has an inductance higher than the equivalent series inductance of the capacitor element.

9. The electrolytic capacitor according to claim 8, wherein the conductive member is given a constriction that makes the width of the conductive member small in a direction that crosses an electrical path extending from one of the anode terminals to the other of the anode terminals along a surface of the conductive member.

10. An electrolytic capacitor, comprising:
   an electrolytic capacitor element having an element body formed by placing two anode foils electrically isolated from each other and a cathode foil one above the other and by winding the anode and cathode foils, anode leads as a pair each electrically connected to corresponding one of the two anode foils, and a cathode lead electrically connected to the cathode foil, a dielectric layer being formed on surfaces of the anode foils, an electrolyte layer being placed between the dielectric layer and the cathode foil;
   anode terminals as a pair each electrically connected to corresponding one of the anode leads as a pair of the capacitor element; and
   a conductive member electrically connecting the anode terminals to each other outside the capacitor element, and composed of a case housing the capacitor element.

11. The electrolytic capacitor according to claim 10, wherein the case is a bottomed cylindrical metal case housing the capacitor element.

12. The electrolytic capacitor according to claim 11, wherein the conductive member has an inductance higher than the equivalent series inductance of the capacitor element.

13. The electrolytic capacitor according to claim 12, wherein the conductive member is given a constriction that makes the width of the conductive member small in a direction that crosses an electrical path extending from one of the anode terminals to the other of the anode terminals along a surface of the conductive member.

14. The electrolytic capacitor according to claim 10, wherein the case is a bottomed cylindrical insulating case with a conductive layer at the inner circumference thereof that houses the capacitor element, and the conductive layer electrically connects the anode terminals to each other.

15. The electrolytic capacitor according to claim 14, wherein the conductive member has an inductance higher than the equivalent series inductance of the capacitor element.

16. The electrolytic capacitor according to claim 15, wherein the conductive member is given a constriction that makes the width of the conductive member small in a direction that crosses an electrical path extending from one of the anode terminals to the other of the anode terminals along a surface of the conductive member.

17. The electrolytic capacitor according to claim 10, wherein the conductive member has an inductance higher than the equivalent series inductance of the capacitor element.

18. The electrolytic capacitor according to claim 17, wherein the conductive member is given a constriction that makes the width of the conductive member small in a direction that crosses an electrical path extending from one of the anode terminals to the other of the anode terminals along a surface of the conductive member.

* * * * *